United States Patent [19]
Rothe et al.

[11] Patent Number: 5,288,960
[45] Date of Patent: Feb. 22, 1994

[54] PROCESS AND APPARATUS FOR THERMAL CUTTING OF WORKPIECES

[75] Inventors: Rüdiger Rothe, Bremen; Ralf Louis, Schleiden, both of Fed. Rep. of Germany

[73] Assignee: Dörries Scharmann GmbH, Fed. Rep. of Germany

[21] Appl. No.: 863,447

[22] Filed: Apr. 3, 1992

[30] Foreign Application Priority Data

Apr. 4, 1991 [DE] Fed. Rep. of Germany ....... 4110805

[51] Int. Cl.$^5$ .............................................. H05B 6/00
[52] U.S. Cl. .................... 219/618; 219/121.18; 219/636; 219/637; 219/628; 51/321; 239/552
[58] Field of Search ..................... 219/10.41, 10.53, 7.5, 219/68, 121.11, 121.18, 121.2, 121.5, 121.9, 8.5, 9.5, 10.43, 10.57, 10.61 R, 10.51; 239/552, 553; 83/53; 415/89, 90; 148/9 R; 51/321, 292

[56] References Cited

U.S. PATENT DOCUMENTS

| | | | |
|---|---|---|---|
| 3,556,410 | 1/1971 | Arant | 239/552 |
| 3,567,898 | 3/1971 | Fein | 219/121 |
| 3,597,578 | 8/1971 | Sullivan | 219/121 L |
| 3,679,863 | 7/1972 | Houldcroft et al. | 219/121 LM |
| 3,713,636 | 1/1973 | Helms et al. | 266/23 NN |
| 3,954,513 | 5/1976 | Boochnakow et al. | 148/9 R |
| 4,002,877 | 1/1977 | Banas | 219/121 LM |
| 4,239,448 | 12/1980 | Graf | 415/89 |
| 4,248,110 | 2/1981 | Spivy | 83/53 |
| 4,380,138 | 4/1983 | Hofer | 51/321 |
| 4,686,877 | 8/1987 | Jaritz et al. | 83/177 |

FOREIGN PATENT DOCUMENTS 244512 10/1989 Fed. Rep. of Germany.

Primary Examiner—Bruce A. Reynolds
Assistant Examiner—Tu Hoang
Attorney, Agent, or Firm—Ostrolenk, Faber, Gerb & Soffen

[57] ABSTRACT

Process and apparatus for thermal cutting of workpieces, such as plate, made of materials which can be melted or decomposed thermally by means of a stream of liquid heated to a temperature above the melting or decomposition temperature of the workpiece to be cut. The stream of liquid serves to transport the heat used to melt or thermally decompose the workpiece to be cut and to induce momentum for the removal of the melted or thermally decomposed material from the workpiece. Apparatus to implement the process can comprise a crucible made of heat resistant material with an insertion opening to accept a metal wire or metal rod inserted into this opening in such a way as to be sealed. The wire is moved by feed rollers. A heating unit at the crucible melts the end of the wire or rod in the crucible. A discharge nozzle for the stream of molten metal produced. Alternatives are to heat the liquid in a container and either pump the liquid out of a discharge nozzle or force it out by compressed gas injected into the container.

16 Claims, 1 Drawing Sheet

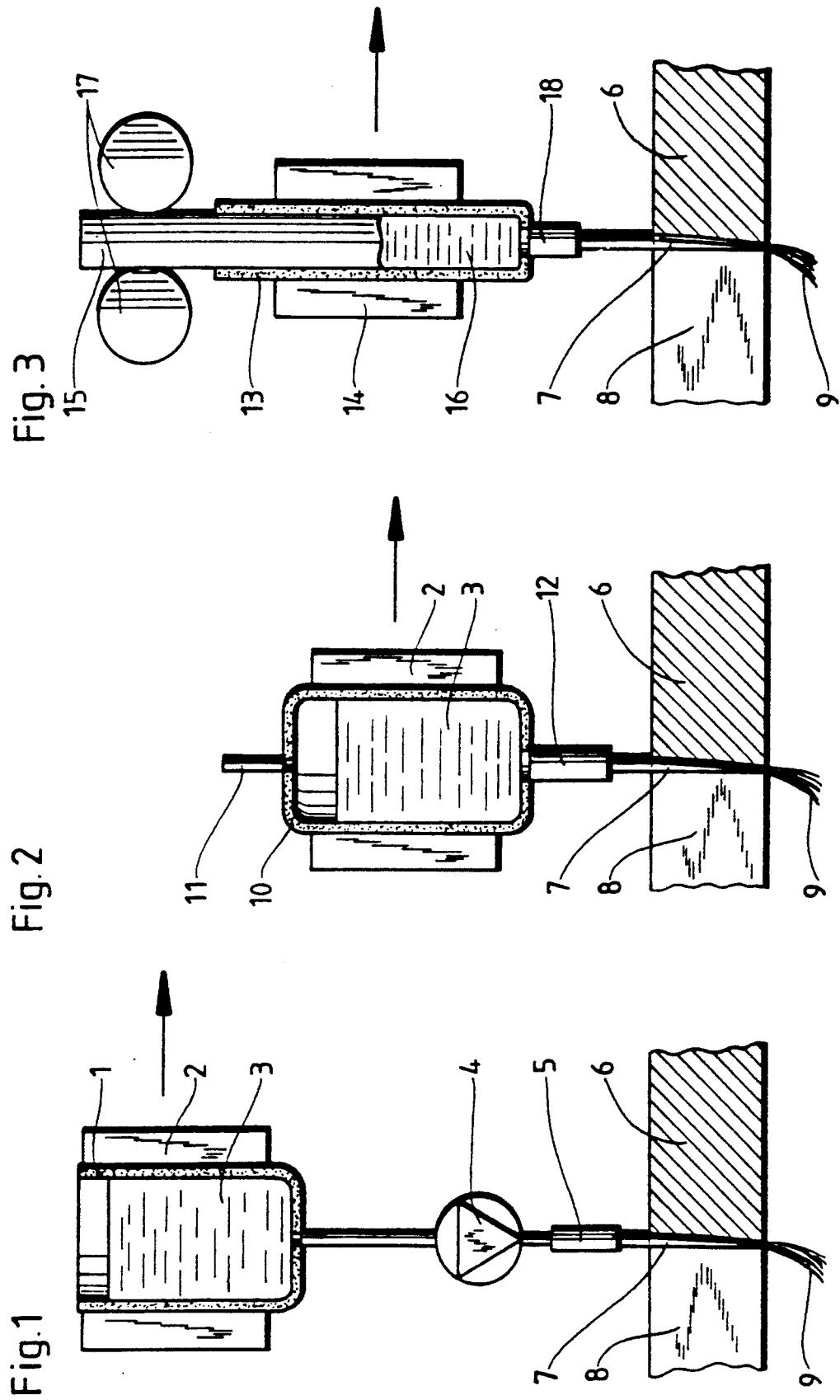

PROCESS AND APPARATUS FOR THERMAL CUTTING OF WORKPIECES

BACKGROUND OF THE INVENTION

The invention pertains to a process and equipment used to cut workpieces by thermal means.

At the present three processes are mainly to cut workpieces thermally in industrial applications. These include oxyacetylene torch cutting, plasma cutting and laser beam cutting.

Oxyacetylene torch cutting, can be used only for steel, in the absence of special adaptive measures. Here heating is primarily by means of a chemical reaction. The rate of the reaction is dependent on the diffusion rates of the co-reactants. The cutting speed in turn is dependent on this reaction rate. When construction steel in a greater thickness range is cut, the cutting speed is between 0.5 and 1.5 meters per minute. The cutting kerfs here will vary in size, ranging in widths of up to a few millimeters.

In plasma cutting energy is applied by means of an electrical arc or plasma which exhibits high electrical power of up to and beyond 100 kW. The heated material is removed from the cutting kerf with the aid of the momentum of the plasma beam. At shallower cutting depths, the cutting speeds for plasma cutting are higher than those for oxyacetylene torch cutting. But, the cutting kerfs at cutting depths of 3 to 10 mm are quite wide, which has an influence on the precision of the cut.

In laser beam cutting, energy is applied by a laser beam and the melted or vaporized material is removed from the cutting kerf by means of a stream of gas. Laser beam cutting gives favorably narrow cutting kerfs and consequently high precision at high cutting speed and low thermal loading of the workpiece being cut. At greater cutting depths, in steel more than 10 mm thick, for example, and depending on the width of the cutting kerf, it becomes impossible to achieve the high cutting speed determined by the laser beam acting as the energy transfer medium since at the high flow rates required for the gas stream to remove the molten material a supersonic shock wave separates from the cutting face after a few millimeters of penetration into the cutting kerf, thus reducing accordingly the effective gas speed at the point where it ought to be high. Thus in laser beam cutting the cutting rate for thicker workpieces is limited since greater momentum cannot be transferred with a stream of gas in a satisfactory way. A medium with a greater specific density than gas, a liquid, for instance, with which greater momentum could be applied, cannot be used in laser beam cutting because light at the wavelength of a $CO_2$ laser is absorbed in all liquids which might be considered for this purpose.

SUMMARY OF THE INVENTION

The object of the invention is to provide a process for thermal cutting of workpieces by which greater momentum can be introduced into the cutting kerf. The energy required for heating is to be applied at the same time. It should be possible to achieve high cutting speeds, even at great cutting depths, and with narrow cutting kerfs, while the apparatus used for this purpose should be simple in design and easy to operate.

To meet these objectives, a process is proposed in which the workpieces, such as plate made of material which is fusible of which decomposes under the application of heat, is cut thermally by a stream of liquid, which has been heated to a temperature that exceeds the melting or decomposition temperature of the workpiece to be cut.

The invention is based on the consideration that greater momentum can be transferred with liquids than with gases, because of the greater density of liquids. When the liquid is heated to the point that its temperature exceeds the melting or decomposition temperature of the material in the workpiece to be cut, the thermal energy can also be introduced into the cutting kerf where the material of the workpiece to be cut melts or decomposes thermally due to this application of energy while the waste is carried out of the cutting kerf by the continuous stream of the liquid. Since the speed of sound propagation in a liquid is very high, the stream of liquid can be moved at very high speed without nearing the speed of sound propagation through the liquid. Thus, the liquid will not encounter the hazard of the separation of shock waves.

A variety of liquids can be used for the stream, depending on the temperature at which the workpiece being cut melts or decomposes thermally. If plastics are to be cut using the process of the invention, it is sufficient to raise liquids with a high vaporization temperature, such as oils, for example, to the required temperature to thereby generate a hot stream of liquid to apply to the material.

To thermally cut materials with higher melting temperatures, such as metals, and particularly steel, the stream of liquid may comprise molten metal. It is preferable to superheat the molten metal to a temperature beyond its melting temperature.

In view of the above the stream of liquid may comprise a material which differs from the material being cut or even the same material may be used. If the stream of liquid comprises a material which reacts exothermically with the material being cut, this would cause additional heat to be applied in the cutting kerf.

On the other hand, it is also be possible for the stream of liquid to comprise a material which would so react with the workpiece material being cut as to lower the melting point of the workpiece material. For example, the stream of liquid may comprise a molten metal which reacts with the material being cut to form a eutectic composition with a lower melting point.

It is preferable to accelerate the stream of liquid to a speed which is high but which is nonetheless below the speed of sound propagation in the liquid, that is preferably to a speed of 150 meters per second, whereby at a stream diameter of 0.3 mm, a high degree of thermal energy can be applied and high momentum can be achieved in the stream of liquid.

When molten metal is used, the stream of liquid can be created by inserting into a crucible, at a speed determined by a feed device, a metal wire or metal rod in such a way that a seal is created at the entry point. This wire or rod is then melted in the crucible and the molten metal is driven out of the crucible and through a nozzle by means of the wire or rod which has not yet been melted and which acts as a piston. The velocity of the exiting stream of molten metal can be increased in relation to the speed at which the metal wire or metal rod is introduced into the crucible in a simple manner, by making the cross sectional area of the nozzle opening from the stream of molten metal smaller than the cross sectional area of the metal wire or metal rod.

A device for implementing this process may comprise a crucible made of heat resistant material and featuring an entry opening to accommodate a metal wire or metal rod which is inserted in a sealed fashion into the entry opening and is advanced by drive rollers, a heating unit at the crucible to melt the end of the wire or rod in the crucible, and a discharge nozzle for an exiting stream of molten metal. The cross sectional area of the nozzle can preferably be smaller than the cross sectional area of the wire or rod. Using such a configuration makes it simple to produce a continuous stream of molten metal since the metal wire or metal rod inserted into the crucible acts as a pressurization piston, the leading end of which melts and this molten mass is driven out of the nozzle at high speed and high temperature.

The configuration used to implement the process can also comprise a pressure-resistant container made of heat-resistant material with a filler opening which can be closed in a pressure resistant manner and through which liquids or pieces of metal can be introduced, a heating unit, a port for applying pressuring gas to the container and a discharge nozzle for heated liquid or molten metal.

Finally, the apparatus used to implement the process may also comprise a container made of heat resistant material with a filler opening for the liquid or piece of metal, a heating unit, a pump for pumping the heated liquid or molten metal and a down line discharge nozzle.

The heating unit can heat with flames, high energy light beams, electrical arcs, direct or indirect electrical resistance heating or inductance heating in order to introduce thermal energy into the material used for the cutting stream. The stream can also be superheated by way of electrical current through resistance heating.

The energy needed to melt the material required for the cutting stream can be spared if the container is filled with molten metal taken directly from a refining or smelting process and if the molten metal is only superheated in the container. It is possible to proceed in this way especially when the process which is the subject of the invention is used to cut extruded ingots or plate in a metal refining or smelting plant.

Other objects and features of the invention are described below with reference to several embodiments shown in the drawings.

BRIEF DESCRIPTION OF THE DRAWINGS

FIG. 1 is a schematic representation of apparatus used to implement the invention as described in a first embodiment;

FIG. 2 is a schematic representation of apparatus used to implement the invention as described in a second embodiment; and FIG. 3 is a schematic representation of apparatus used to implement the invention as described in a third embodiment.

DESCRIPTION OF PREFERRED EMBODIMENTS

The first embodiment of FIG. 1 uses a container 1 made of a heat resistant material proof of liquid, particularly and molten metal 3, is disposed in the container. This liquid can be placed in the container 1 in its liquid state if the operator is using oil, for example, for thermal cutting plastics. It is also possible to fill the container 1 directly with molten metal. Finally, solid pieces of metal can be placed in the container 1 and these are then melted by a heating unit 2 and are heated to above the melting temperature. The heating unit 2 is shown schematically as a device which surrounds the container 1. It could be an electrical resistance heater used to heat oil. It is also possible to use an induction coil for inductance heating of metal placed in the container 1. In addition, the material in the container 1 can be heated directly with a flame, high-energy light beams or electrical arcs in order to melt the metal present in container 1 and to heat it above its normal melting temperature. Finally, use of direct or indirect electrical resistance heating is also possible.

The heated liquid, and in particular a molten metal, passes down a conduit from the container 1, through a pump 4 to a nozzle 5 which is located above and which has an outlet toward the workpiece 6 to be cut. The material of the workpiece 6 is either melted or thermally decomposed by means of a heated stream of liquid 7, and particularly by a stream of molten metal, discharged from the nozzle 5. The momentum of the stream of liquid 7 sweeps the material out of the cutting kerf thus formed. This causes a stream 9 to exit from the cutting kerf 8, comprising a mixture of the material in the stream of liquid and the material which was melted or thermally decomposed. The stream of liquid 7 is moved relative to the workpiece 6 i.e. across the workpiece to form the groove.

A molten stream of steel measuring 0.3 mm in diameter, moving at a velocity of 150 m/sec and superheated to 200° C. above the melting point will carry thermal energy of about 125 kW, corresponding to energy flow density of approximately $1.8 \cdot 10^8$ W/cm$^2$. The latent thermal energy in the molten metal which is available directly for melting the material being cut, such as steel, amounts to 12 kW. It is possible to utilize a large portion of this energy with its correspondingly high energy flow density for cutting purposes. Furthermore, the momentum of the cutting stream at the velocity noted above is very high, although the velocity of the stream is below the speed of sound propagation through the liquid. Thus, it is not difficult to introduce into the cutting kerf the momentum required to carry away the melted material presents, even where the cutting kerf is very narrow, corresponding to the diameter of the stream.

The cutting speed can be very high, as a result of the balancing of momentum and power.

In addition to the materials such as oil and molten metal already mentioned for potential use as the liquid stream, other materials which are similar or dissimilar to the material being cut can be used in conjunction with a number of materials. These are selected so as to promote chemical reactions which will release exothermic energy or reduce the melting point or prevent formation of cutting slag or facilitate the removal of that slag.

Using the process which is the subject of the invention makes it possible to cut thermal unstable materials, such as plastics or laminated materials, where the temperature of the stream of liquid is above the melting or decomposition temperature of the material.

Since it is difficult to use pumps for high temperature liquid, the energy used to accelerate the stream of liquid can be applied by introducing gas under pressure above the molten liquid 3. The second embodiment of apparatus shown in FIG. 2 has for this purpose a pressure-resistant container 10 with a compressed gas injection port. A nozzle 12 is attached directly to the lower section of the pressure-resistant container 10. The heated liquid or molten metal 3 present in the container 10 can be driven out of the nozzle 12 at high speed by applying compressed gas introduced through the injection port 11. The workpiece 6 is then cut in the manner already described.

The apparatus as shown in FIGS. 1 and 2 can be operated primarily in a discontinuous fashion because the containers 1 and 10 have only a finite volume. However, the apparatus shown in FIG. 3 allows for a continuous liquid stream cutting process. The apparatus shown in FIG. 3 comprises a crucible 13 in the shape of a tube and into which a metal wire or metal rod 15 is inserted under pressure by drive rollers 17. In the example shown, the crucible 13 comprises a tube having an inside diameter which is essentially equal to the outside diameter of the metal wire or metal rod 15. However, the crucible can also be designed as a container and the metal wire or metal rod 15 would then be inserted through an insertion opening in the container of a size appropriate to create a seal around the wire. A heating unit 14 is provided around the crucible 13. It melts the leading end of the metal wire or metal rod 15 and then superheats the molten metal to above its melting point so that only molten metal 16 will be present in the section of the crucible 13 above the discharge nozzle. The molten metal 16 is driven out of the nozzle 18 at high speed by means of the entering metal wire or metal rod 15, which acts as a piston and which is continuously inserted into the crucible by means of drive rollers 17. The discharge speed of the molten metal is proportional to the ratio of the cross sectional area of the metal or metal rod 15 to the cross sectional area of the nozzle 18. This means that a high discharge speed can be achieved in a simple manner. If, for example, the wire is 3 mm in diameter and the nozzle opening is 0.3 mm in diameter, the result will be a discharge velocity of the melt 16 from the nozzle 18 which is 100 times the feed speed of the metal wire or metal rod 15. To achieve a discharge speed of 150 m/sec, it is sufficient to feed the metal wire or metal rod 15 at a speed of only 1.5 m/sec. It is further advantageous that the sealing of the metal wire or metal rod 15 in the crucible 13 is effected without need for any special sealing measures since the molten metal 16 fills any gap which may be present between the metal wire or metal rod 15 and the crucible 13 and the molten metal will harden as it move up near the insertion opening without causing any appreciable hindrance to the insertion motion of the metal wire or metal rod 15 into the crucible 13 if a suitable material is selected for the crucible 13 and if provision is made for suitable lubrication, if necessary.

We claim:

1. A process for thermally cutting a workpiece made of a material having a breakdown temperature at which the material is either melted or thermally decomposed, the process comprising the steps of:
    heating a liquid up to a temperature above the breakdown temperature of the material to be cut, said heating comprising the steps of feeding a wire or rod into a crucible and creating a seal on the wire or rod where it is being fed into the crucible, and melting the wire or rod in the crucible as it is being fed in; and
    forming the liquid into a stream and directing the stream onto the material to be cut for either melting or thermally decomposing the workpiece where it is contacted by the liquid, the directing of the stream comprising discharging the liquid from the crucible through a nozzle, wherein the wire or rod being fed acts like a piston on contents of the crucible to discharge the heated liquid through the nozzle.

2. The process of claim 1, wherein the heated liquid is comprised of molten metal.

3. The process of claim 2, wherein the heating comprises superheating the molten metal to a temperature above the breakdown temperature of the workpiece and then directing a stream of the molten metal onto the workpiece.

4. The process of claim 2, wherein the workpiece also is comprised of metal.

5. The process of claim 1, wherein the material of which the heated liquid is comprised is selected so as to differ from the material of the workpiece.

6. The process of claim 4, wherein the material of which the heated liquid is comprised is a material which has the characteristic of reacting exothermically with the material of the workpiece to be cut.

7. The process of claim 1, wherein the material of the heated liquid is selected to be a material which reacts with the material of the workpiece to lower the melting point of the material of the workpiece for aiding the cutting of the workpiece.

8. The process of claim 1, wherein the stream of liquid is directed onto the workpiece at a speed sufficient to permit the force of the heated liquid to help cut the workpiece, said speed being below a speed at which sound propagate through the heated liquid.

9. The process of claim 8, wherein the stream of heated liquid is moved at a speed of about 150 m/sec and is formed into a stream having a diameter of about 0.3 mm.

10. The process of claim 8, wherein the heated liquid is comprised of steel and wherein the stream of heated liquid is moved at a speed of about 150 m/sec and is formed into a stream having a diameter of about 0.3 mm.

11. The process of claim 1, wherein the cross section of the wire and speed of feeding the wire or rod into the crucible are selected and the cross section of the opening of the nozzle are selected so that the speed of the stream of molten metal exiting from the nozzle in greater than the speed of the metal wire or rod being fed into the crucible.

12. The apparatus for cutting a workpiece by a stream of molten liquid that has been brought up to a temperature above the melting or decomposition temperature of a workpiece to be cut, the apparatus comprising:
    a crucible having an entrance opening for receiving a metal wire or rod which is fed into the opening, the entrance opening being sized with respect to the wire or rod as to create a seal with the wire or rod as it is being fed in;
    feed means for feeding the wire or rod into the entrance opening to the crucible;
    heating means at the crucible for supplying heat to the crucible to melt an end of the wire or rod that has been fed into the crucible;
    a discharge nozzle placed in the crucible for receiving a stream of molten metal from the crucible as the metal wire or rod is fed into the crucible.

13. The apparatus of claim 12, wherein the crucible is comprised of heat resistant material.

14. The apparatus of claim 12, wherein the feed means comprises feed rollers engaging the wire or rod and rotatable for feeding the wire or rod into the entrance opening of the crucible.

15. The apparatus of claim 12, wherein the cross sectional area of the discharge nozzle from the crucible is smaller than the cross sectional area of the wire or rod, whereby the speed of the stream of molten metal exiting through the discharge nozzle exceeds the speed at which the metal wire or rod is fed into the crucible.

16. The apparatus of claim 12, wherein the heating means applies heat to the material in the crucible by one selected from the group consisting of flame, high energy light beam, electric arc, direct or indirect electric resistance heating, and inductance heating.

* * * * *